Sept. 30, 1924.                    C. W. HALL                    1,509,948
                                    NUT LOCK
                              Filed June 22, 1923
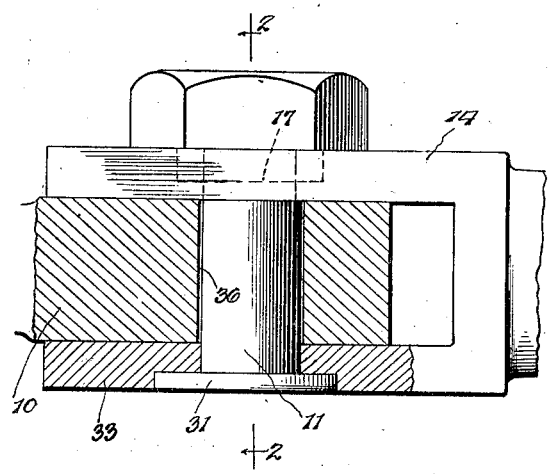
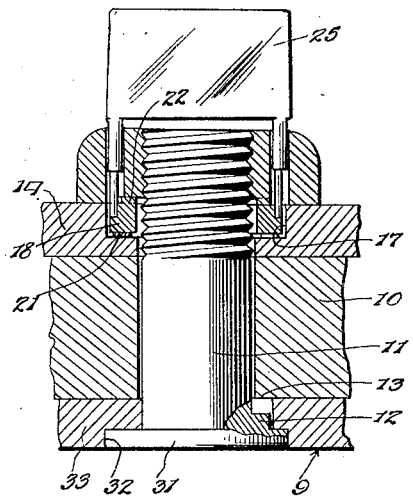
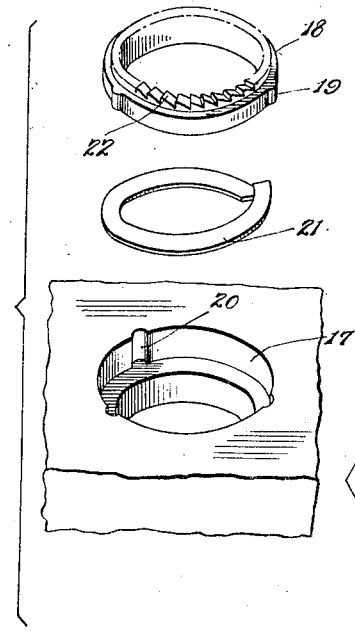
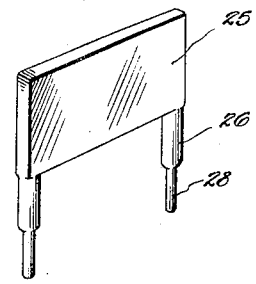
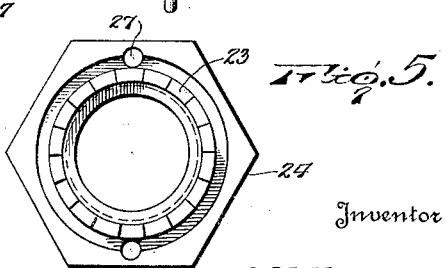
Inventor
C.W.Hall.
By Lacey & Lacey, Attorneys Patented Sept. 30, 1924.

1,509,948

UNITED STATES PATENT OFFICE.

CHARLES W. HALL, OF PRINCETON, WEST VIRGINIA.

NUT LOCK.

Application filed June 22, 1923. Serial No. 647,051.

*To all whom it may concern:*

Be it known that I, CHARLES W. HALL, a citizen of the United States, residing at Princeton, in the county of Mercer and State of West Virginia, have invented certain new and useful Improvements in Nut Locks, of which the following is a specification.

The present invention relates to a device for locking nuts and bolts together. One object of the invention is to provide a device of this character, which is suitable to lock wrist pins, crossheads, bolts on engines, or the like. It is also applicable to track bolts and whenever a nut lock is required for rigidly securing such parts together.

The nut lock is particularly advantageous in cases where machinery subject to vibration is concerned and the lock will prevent the loosening of bolts and nuts under like circumstances.

In the accompanying drawing one embodiment of the invention is illustrated, and

Fig. 1 is a side elevation of a nut lock partly in section;

Fig. 2 is an axial section along line 2—2 of Fig. 1;

Fig. 3 is a perspective view of some of the details of the nut lock;

Fig. 4 is a key for releasing the lock and

Fig. 5 is a bottom plan view of the lock nut.

The reference numerals 9 and 10 represent two machine parts such as a crosshead and a pitman which are to be bolted together, and the reference numeral 11 represents a bolt or wrist pin, which is held from turning in the part 9 by means of a stud 12 engaging in a corresponding notch 13 therein. In the recess 17 formed in the wall 14 of machine part 9 is placed a locking ring 18, which is provided with a number of small projections 19 adapted to engage the corresponding longitudinal notches 20 formed in the wall of the recess 17. Between the ring 18 and the bottom of the recess 17 is inserted a flat spring 21, which tends to raise the ring in the recess. The upper side of the ring 18 has a plurality of ratchet teeth 22, which are inclined in one direction and intended to engage with corresponding teeth 23 provided on the under side of the nut 24. The nut is threaded on the bolt 11 and, when drawn up tightly against the machine part 9, will be held from unscrewing through the engagement of its teeth 23 with the teeth 22 of the ring 18 which, in turn, is held from rotating by means of the projections 19 engaging the notches 20 in the wall 14.

In Fig. 4 is shown a key 25 having a pair of shanks 26 adapted to engage in corresponding apertures 27 provided in the nut 24 and running straight up and down through the same so as to open into the recess 17, when the nut is in position. The extreme ends 28 of the shanks 26 are pointed and project below the bottom face of the nut, when the shanks 26 are inserted in the apertures 27 thereof. In this manner, by a slight push downward on the key 25, the ring 18 will be depressed against the action of the spring 21 in the recess 17 of the wall 14, so that the ratchet teeth will disengage and the nut then is free to be unscrewed by means of an ordinary wrench.

In the figures is shown the application of the device on a crank connection for an engine. The head 31 of the bolt is preferably countersunk in the side wall 33 of the crosshead, as at 32, and the shank of the bolt 11 engages in an opening 36 in the pitman 10, which is inserted between the side walls 33 and 14 of the crosshead 9. The ring 18 and spring 21 being placed in the recess 17 formed in the side wall 14 of the crosshead, will in this manner hold the bolt or wrist pin 11 locked from turning in the crosshead, while the pitman 35 is revolubly engaged with the wrist pin.

It is evident that the utility of the nut lock is not limited to the machine parts as described above, but that it may equally well be used for other purpose, as, for instance, to secure fishplates to ends of rails in a rail joint and for other similar functions, where nut locks are required.

Having thus described the invention, what is claimed as new is:

The combination of a plurality of members to be connected, a bolt inserted through the members, one of the members having an annular recess in its outer side concentric with the bolt and provided with longitudinal grooves in the annular wall of said recess, a nut fitted on the end of the bolt over said recess and provided on its inner side with an annular series of ratchet teeth, a ring fitted in the recess around the bolt, peripheral lugs on said ring engaging the grooves in the annular wall of the recess, ratchet teeth on the upper side of said ring meshing with the ratchet teeth on the nut, and a split spring washer seated in the recess below and bearing against the ring to hold it to the nut, the nut having key-receiving openings therethrough and the ring having a marginal portion radially beyond the ratchet teeth to be engaged by the key.

In testimony whereof I affix my signature.

CHARLES W. HALL. [L. S.]